Jan. 9, 1940.  G. STOLBERG  2,186,218
WELDING APPARATUS
Filed Jan. 6, 1937   2 Sheets-Sheet 1

WITNESSES:
Chw. C. Groome
Hymen Diamond

INVENTOR
Gottfried Stolberg.
BY
F. W. Lyle,
ATTORNEY

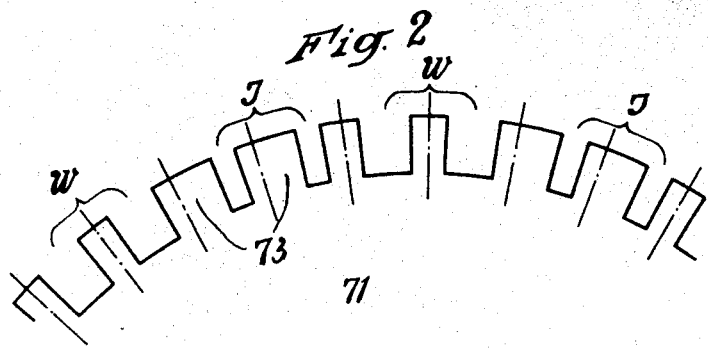
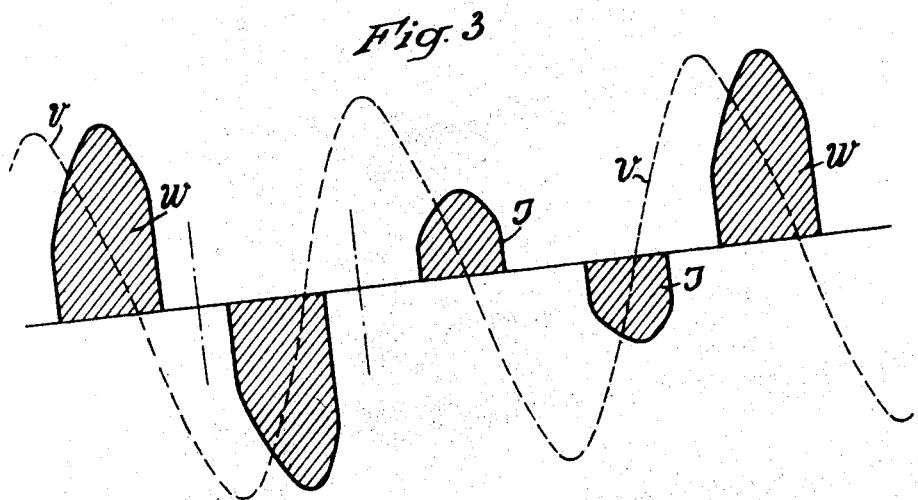

Patented Jan. 9, 1940

2,186,218

UNITED STATES PATENT OFFICE 2,186,218

WELDING APPARATUS

Gottfried Stolberg, Berlin-Charlottenburg, Germany, assignor to Westinghouse Electric & Manufacturing Company, East Pittsburgh, Pa., a corporation of Pennsylvania Application January 6, 1937, Serial No. 119,256
In Germany October 16, 1935

2 Claims. (Cl. 250—41.5)

My invention relates, generally, to welding apparatus and it has particular relation to resistance welding apparatus.

This invention constitutes an improvement on the inventions disclosed in application Serial No. 710,095 of Edwin H. Vedder, filed February 7, 1934, application Serial No. 728,363 of John W. Dawson, filed May 31, 1934, and application Serial No. 747,904, of Arthur M. Unger, filed October 11, 1934, all of which are assigned to the assignee of this application.

When employing the apparatus described in the above-mentioned applications for the manufacture of pipes and of similar bodies having long welding seams and consisting of light metal, such as aluminum and the alloys thereof, the current supply to the bodies to be welded is controlled in such a manner that a certain portion of each half cycle of the alternating current is only utilized (Figs. 1 and 4 of the last-mentioned application). In such and similar apparatus a local overheating of the weld and, therefore, a deterioration of the material at the weld may occur. It has, therefore, been proposed to interrupt or to considerably reduce the current supply by the mechanical or electrical method for fractions of a second and also to re-establish the supply of current momentarily. It is true that in this manner an overheating of the single welds is prevented; however, the system itself operates uneconomically, since at the same welding speed and with the same total energy required for the welding operation, the electrical output necessary during the welding period must be a multiple of the current required when welding with continuous current. The result is that such systems must be rated in accordance with these welding current peaks and, therefore, the welding transformer and above all the control means must be amply dimensioned so that the initial cost is considerable.

These drawbacks are avoided according to the invention in that also in the periods of interruption of the welding current, current of such intensity is supplied to the electrodes as to produce an effective heating of the point to be welded. In this manner, the electrical heat output is distributed and the peak load required during the welding operation is considerably reduced. Besides, by this preheating or intermediate heating, the weld is pretreated so that the condition of the weld is approximately the same before and during the welding process proper. This preheating and intermediate heating is particularly advantageous to welding seams on light metals.

Fig. 2 is a part of the top plan view of the timer disc which is provided as a part of the photo-timer mechanism; and Fig. 3 shows a curve which demonstrates the functioning of my invention.

Figure 1:
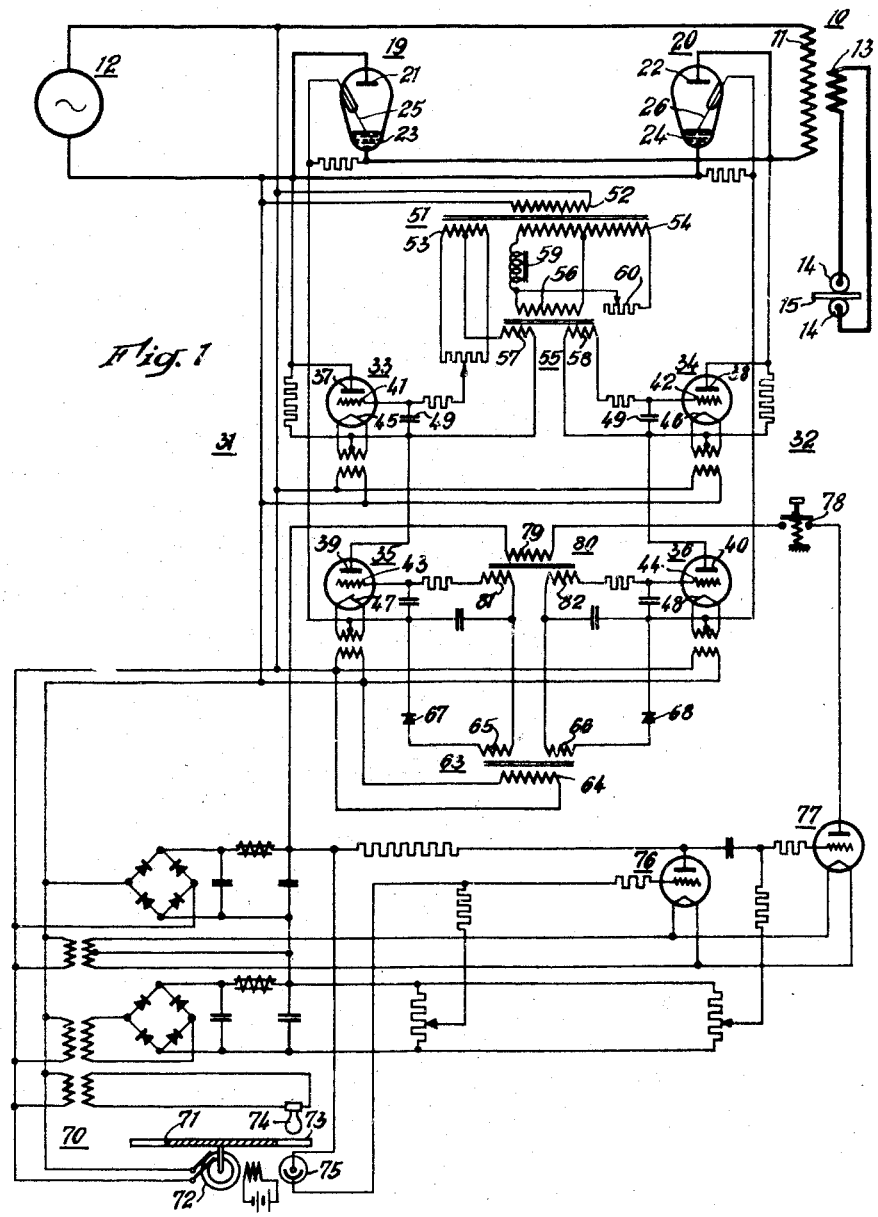
Fig. 1 illustrates, diagrammatically, a control system organized in accordance with my invention.

Referring now particularly to Fig. 1 of the drawings, the reference character 10 designates, generally, a welding transformer having a primary winding 11, which is connected to be energized from a source of alternating current 12, which may be a 60-cycle generator. The secondary winding 13 of the welding transformer 10 is connected to supply current to a welding circuit including electrodes 14 between which work 15, on which a welding operation is to be performed, may be placed.

In order to control the flow of welding current to the welding circuit, a pair of inversely connected arc discharge devices, shown generally at 19 and 20, is provided and is connected between the primary winding 11 of the welding transformer 10 and the alternating-current source 12. Each of the arc discharge devices 19 and 20 comprises, respectively, anodes 21 and 22, mercury pool cathodes 23 and 24, and control electrodes 25 and 26. When current is caused to flow from the anodes 21 and 22 through the control electrodes 25 and 26 into the mercury pool cathodes 23 and 24, cathode spots are formed on the cathodes which will cause the arc discharge devices 19 and 20 to become conducting when thus ignited, provided that the proper polarity for which they are adapted to be conducting is applied thereto. In other words, each of the arc discharge devices 19 and 20 will become conducting on the application of the proper polarity or half cycle thereto provided that the cathode spot is formed in the half cycle for which either of them is adapted to become conducting. The arc discharge devices 19 and 20 will remain in the conducting state until the end of a half-cycle and will not again become conducting unless in a succeeding half cycle the cathode spot is formed as described herein.

In order to energize the control electrodes 25 and 26 for the purpose of forming the cathode spots in the arc discharge devices 19 and 20, control circuits, shown generally at 31 and 32, are provided. The circuits 31 and 32 comprise space discharge devices 33 and 34, respectively, which are controlled by means of a phase-shifting circuit, and also space discharge devices 35 and 36, which are disposed to be controlled by means of a photo-timer circuit. As illustrated, each of the space discharge devices 33, 34, 35 and 36 is provided, respectively, with anodes 37, 38, 39 and 40, grids 41, 42, 43 and 44, and hot cathodes 45, 46, 47 and 48.

As illustrated, a capacitor 49 is connected between each of the grids 41, 42, 43 and 44 and its respective cathode 45, 46, 47 and 48, in order to maintain the former at a predetermined potential relative to the latter.

As set forth hereinbefore, the space discharge devices 33 and 34 are controlled by means of a phase-shifting circuit. This circuit is energized by means of a phase-shifting transformer shown generally at 51, and comprising a primary winding 52 which is connected for energization to the alternating-current source 12 and secondary windings 53 and 54. A phase-shift grid transformer 55 is provided having a primary winding 56 which is disposed to be energized from the secondary winding 54. The phase-shift grid transformer 55 is provided with secondary windings 57 and 58, which are connected respectively to the grids 41 and 42 of the space discharge devices 33 and 34 for applying thereto the proper energizing potential.

It will be observed that the primary winding 56 of the grid transformer 55 is connected to the secondary winding 54 through a phase-shifting network comprising an inductor 59 and an adjustable resistor 60. The times at which the grids 41 and 42 have applied thereto the proper energizing potential will depend upon the adjustment of the resistor 60, as will be readily understood.

Since it is not ordinarily desirable to have the arc discharge devices 19 and 20 conducting during each successive half cycle, but rather to have them conducting for a predetermined number of half cycles, and non-conducting for a predetermined number of other half cycles, the space discharge devices 35 and 36 are provided for effecting this operation. When the devices 35 and 36 are rendered conducting the circuit is completed between the anodes 21 and 22 and the cathodes 23 and 24 of the arc discharge devices 19 and 20, respectively, through the control electrodes 25 and 26, so that the cathode spots described hereinbefore will be formed to render the arc discharge devices 19 and 20 conducting.

In order to maintain the space discharge devices 35 and 36 in the non-conducting state, a transformer shown generally at 63, is provided, having a primary winding 64 connected for energization to the source 12, and secondary windings 65 and 66. The secondary windings 65 and 66 are connected, respectively, through rectifiers 67 and 68 to the grids 43 and 44, so that the indicated negative potentials may be applied thereto for maintaining the space discharge devices 35 and 36 in the non-conducting state.

The negative potential which is normally applied to the grids 43 and 44 is overcome at predetermined times by means of a photo-timer system, which is generally shown at 70. The photo-timer system 70 comprises a disc 71 which is arranged to be rotated by means of a synchronous motor 72. As illustrated more clearly in Fig. 2 of the drawings, the disc 71 is provided with 120 teeth 73 of different kind in the periphery thereof. The teeth 73 are arranged to intercept the light rays from a light source 74 as they fall on a photo-electric cell 75.

The photo-electric cell 75 is connected to an amplifier tube, shown generally at 76, the output of which is applied to a timer control tube 77 in the form of impulses. The timer control tube 77 is arranged to be connected by means of a push-button switch 78 to the primary winding 79 of an impulse transformer, shown generally at 80. This transformer is provided with secondary windings 81 and 82, which are connected, respectively, to the grids 43 and 44. The impulses which are applied to the secondary windings 81 and 82 and to the grids 43 and 44, are of such polarity as to overcome the negative ionizing potential which is normally applied thereto, and further, to provide a positive ionizing potential to the grids. When the positive ionizing potential is applied to the grids 43 and 44, the space discharge devices 35 and 36 are rendered conducting.

In order to obtain the maximum effect of the impulses which are provided by the photo-timer system 70, the space discharge devices 35 and 36 would ordinarily be rendered conducting only during one-fourth of a cycle of the alternating current effective for the proper welding. In order to extend the range of control afforded by the photo-timer system 70, resistors 91 and 92 are provided and are connected in shunt circuit relation with the phase-shift control space discharge devices 33 and 34. It will be understood that the resistors 91 and 92 are connected respectively, in series circuit relation with the space discharge devices 35 and 36.

The ohmic values of the resistors 91 and 92 are so chosen that sufficient current is permitted to flow therethrough to maintain the space discharge devices 35 and 36 in the ionized condition for the remainder of each half cycle in which they have been rendered conducting. However, sufficient current is not permitted to flow to form the cathode spots on the cathodes 23 and 24 and thus render the arc discharge devices 19 and 20 conducting.

Fig. 3 shows a series of successive cycles of alternating current, the portions W illustrating the welding current, while the portions I illustrate the current flowing between the cycles and serving for preheating or intermediately heating the weld. V indicates the voltage curve.

To produce this current curve the teeth 73 of the disc 71 are differently shaped as shown in Fig. 2. The regular circular pitch for the gearing is indicated by dotted lines. The spaces between the teeth for the light falling on the photo-electric cell 75 are then shifted in groups with respect to the regular circular pitch so as to produce the different current curves W and I. The groups of teeth may be also arranged in such a manner that various cycles or only one intermediate heating cycle follow various welding cycles.

It is necessary for the space discharge devices 33 and 34 to be rendered conducting by means of the phase-shifting circuit before the cathode spots are formed. It will then be observed that the range of control for the arc discharge devices 19 and 20 has been extended over an entire half cycle. The space discharge devices 35 and 36, in combination with the photo-timer system 70, control the particular half cycles during which it is desired that the arc discharge devices 19 and 20 permit the flow of current. The particular time in each half cycle at which current is permitted to flow to the welding circuit is controlled by means of the space discharge devices 33 and 34 and the associated phase-shifting system.

Since certain further modifications of this invention may be made without departing from the scope thereof, it is intended that all matter shown in the accompanying drawings, or described in the specification, be considered as illustrative, and not in a limiting sense.

I claim as my invention:

1. An electric system comprising, in combination, a load circuit of which it is desired to vary the average value of an alternating current from a larger to a smaller value for periods of the order of a few cycles of said alternating current, circuit means connecting the load circuit to a source of said alternating current, arc discharge means connected to control the flow of current in said load circuit, and a driven screen with teeth alternately arranged in different groups in the divisions of the periphery of the screen, the spacings between teeth in a given group being similar but the spacings for successive groups being different, the screen controlling photo-electric means for rendering said arc discharge of alternately greater and smaller average conductivity, said smaller average conductivity being still of substantial amount.

2. An electric system comprising, in combination, a load circuit, circuit means for connecting the load circuit to a source of alternating current, arc discharge means connected to control the flow of current in said load circuit, and a synchronously driven screen with teeth alternately arranged in different groups in the divisions of the periphery of the screen, the spacings between teeth in a given group being similar but the spacings for successive groups being different, the screen controlling photo-electric means for rendering said arc discharge of alternately greater and smaller average conductivity, said smaller average conductivity being still of substantial amount.

GOTTFRIED STOLBERG.